(12) United States Patent
Knez

(10) Patent No.: US 9,853,805 B1
(45) Date of Patent: Dec. 26, 2017

(54) BUFFERED EQUIDISTANT DATA ACQUISITION FOR CONTROL APPLICATIONS

(71) Applicant: DEWESoft d.o.o., Trbovlje (SI)

(72) Inventor: Jure Knez, Trbovlje (SI)

(*) Notice: Subject to any disclaimer, the term of this patent is extended or adjusted under 35 U.S.C. 154(b) by 0 days.

(21) Appl. No.: 15/441,294

(22) Filed: Feb. 24, 2017

(51) Int. Cl.
*H04L 7/00* (2006.01)
*G06F 13/16* (2006.01)
*H04L 29/12* (2006.01)
*H04L 29/06* (2006.01)

(52) U.S. Cl.
CPC .......... *H04L 7/0008* (2013.01); *G06F 13/161* (2013.01); *G06F 13/1673* (2013.01); *H04L 61/25* (2013.01); *H04L 65/608* (2013.01)

(58) Field of Classification Search
CPC ..... H04L 7/0008; H04L 61/25; H04L 65/608; G06F 13/161; G06F 13/1673
See application file for complete search history.

(56) References Cited

U.S. PATENT DOCUMENTS

| | | | |
|---|---|---|---|
| 4,126,764 A | 11/1978 | Downey et al. | |
| 4,730,346 A | 3/1988 | Jiang | |
| 5,625,842 A | 4/1997 | Dalrymple | |
| 6,052,743 A * | 4/2000 | Schwan | G06F 9/544 710/23 |
| 6,085,270 A | 7/2000 | Gulick | |
| 6,151,334 A | 11/2000 | Kim et al. | |
| 6,333,938 B1 | 12/2001 | Baker | |
| 6,404,770 B1 | 6/2002 | Fujimori et al. | |
| 6,408,351 B1 | 6/2002 | Hamdi et al. | |
| 6,574,231 B1 | 6/2003 | Leung | |
| 6,754,755 B1 | 6/2004 | Johnson et al. | |
| 6,865,241 B1 * | 3/2005 | Adkins | G06F 13/4059 375/372 |
| 7,627,701 B2 | 12/2009 | Basso et al. | |
| 7,904,617 B2 | 3/2011 | Basso et al. | |
| 2011/0022742 A1 * | 1/2011 | Endo | G06F 13/1673 710/33 |
| 2011/0029101 A1 * | 2/2011 | Castro Scorsi | G05B 19/4183 700/73 |
| 2011/0276775 A1 * | 11/2011 | Schuetz | G06F 13/1673 711/165 |
| 2013/0232155 A1 * | 9/2013 | Yang | G11B 20/10527 707/752 |
| 2014/0129752 A1 | 5/2014 | Castro Scorsi et al. | |
| 2014/0334553 A1 | 11/2014 | Novotny et al. | |
| 2015/0124842 A1 | 5/2015 | Chandhoke et al. | |
| 2015/0301085 A1 | 10/2015 | Bryson et al. | |

* cited by examiner

*Primary Examiner* — Syed Haider

(57) ABSTRACT

A method for configuring a transfer of signals associated with an iterative and synchronized, time-based data acquisition (DAQ) operation between at least one input device and at least one output device is disclosed herein. The method includes requesting and receiving signal data samples (SDSs) from the at least one input device. A series of the SDSs are mapped to a buffer. The time indicators of SDSs are compared to confirm that SDSs are incrementally-next in time relative one another. A missing signal data sample is retransmitted if necessary. The series of SDSs is remapped in the buffer as necessary to arrange the series in time sequence. The method also includes transmitting in real time at least a portion of the present signal data sample to an output device prior to receiving the missing signal data sample.

20 Claims, 6 Drawing Sheets

BUFFERED EQUIDISTANT DATA ACQUISITION FOR CONTROL APPLICATIONS

BACKGROUND

1. Field

The present disclosure relates to method and system for isochronous data acquisition and control.

2. Description of Related Prior Art

U.S. Pub. No. 20150124842 discloses a Lossless Time Based Data Acquisition and Control in a Distributed System. The disclosure alleges to relate to systems and methods for mapping an iterative time-based data acquisition (DAQ) operation to an isochronous data transfer channel of a network. A time-sensitive buffer (TSB) associated with the isochronous data transfer channel of the network may be configured. A data rate clock may and a local buffer may be configured. A functional unit may be configured to initiate continuous performance of the iterative time-based DAQ operation, transfer data to the local buffer, initiate transfer of the data between the local buffer and the TSB at a configured start time, and repeat the transferring and initiating transfer in an iterative manner, thereby transferring data between the local buffer and the TSB. The TSB may be configured to communicate data over the isochronous data transfer channel of the network, thereby mapping the iterative time-based DAQ operation to the isochronous data transfer channel of the network.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

A method for configuring a transfer of signals associated with an iterative and synchronized, time-based data acquisition (DAQ) operation between at least one input device and at least one output device includes requesting and receiving, at a controller having one or more processors, in real time, signal data samples from the at least one input device. The method also includes preliminarily mapping, with the controller, a series of the received signal data samples to a buffer as requesting and receiving is repeated after predetermined and equidistant time intervals. The method also includes comparing with the controller a time indicator of each of the series of received signal samples against a time indicator of each of the series of received signal data samples against a time indicator of a previously-received signal data sample to confirm that no signal data sample is lost. The method also includes requesting from the at least one input device with the controller a missing signal data sample in response to said comparing if one of the signal data samples is lost. The method also includes transmitting the missing signal data sample to the controller from the at least one input device in response to the requesting the missing signal data sample. The method also includes receiving at the controller, from the at least one input device, the missing signal data sample in response to the transmitting. The method also includes remapping the series of signal data samples in the buffer with the controller to arrange the series in time sequence. The method also includes transmitting in real time, with the controller, to the at least one output device, at least a portion of the present signal data sample prior to receiving the missing signal data sample by the controller.

A system for configuring a transfer of signals associated with an iterative and synchronized, time-based data acquisition (DAQ) operation between at least one input device and at least one output device includes an input device configured to transmit signal data samples associated with a test subject. The system also includes a computing device in communication with the input device. The computing device includes a controller with one or more processors and a non-transitory, computer readable medium storing instructions that, when executed by the one or more processors, cause the computing device to perform operations including requesting and receiving, in real time, signal data samples from the at least one input device. The operations also include preliminarily mapping a series of the received signal data samples to a buffer as the requesting and receiving is repeated after predetermined and equidistant time intervals. The operations also include comparing with the controller a time indicator of each of the series of received signal data samples against a time indicator of a previously-received signal data sample to confirm that no signal data sample is lost. The operations also include requesting from the at least one input device with the controller a missing signal data sample in response to said comparing if one of the signal data samples is lost. The operations also include transmitting the missing signal data sample to the controller from the at least one input device in response to the requesting the missing signal data sample. The operations also include receiving at the controller, from the at least one input device, a missing signal data sample in response to the transmitting. The operations also include remapping the series of signal data samples in the buffer with the controller to arrange the series in time sequence. The operations also include transmitting in real time, with the controller, to the at least one output device, at least a portion of the present signal data sample prior to the receiving the missing signal data sample by the controller.

BRIEF DESCRIPTION OF THE DRAWINGS

The detailed description set forth below references the following drawings.

DETAILED DESCRIPTION

Figure 1:
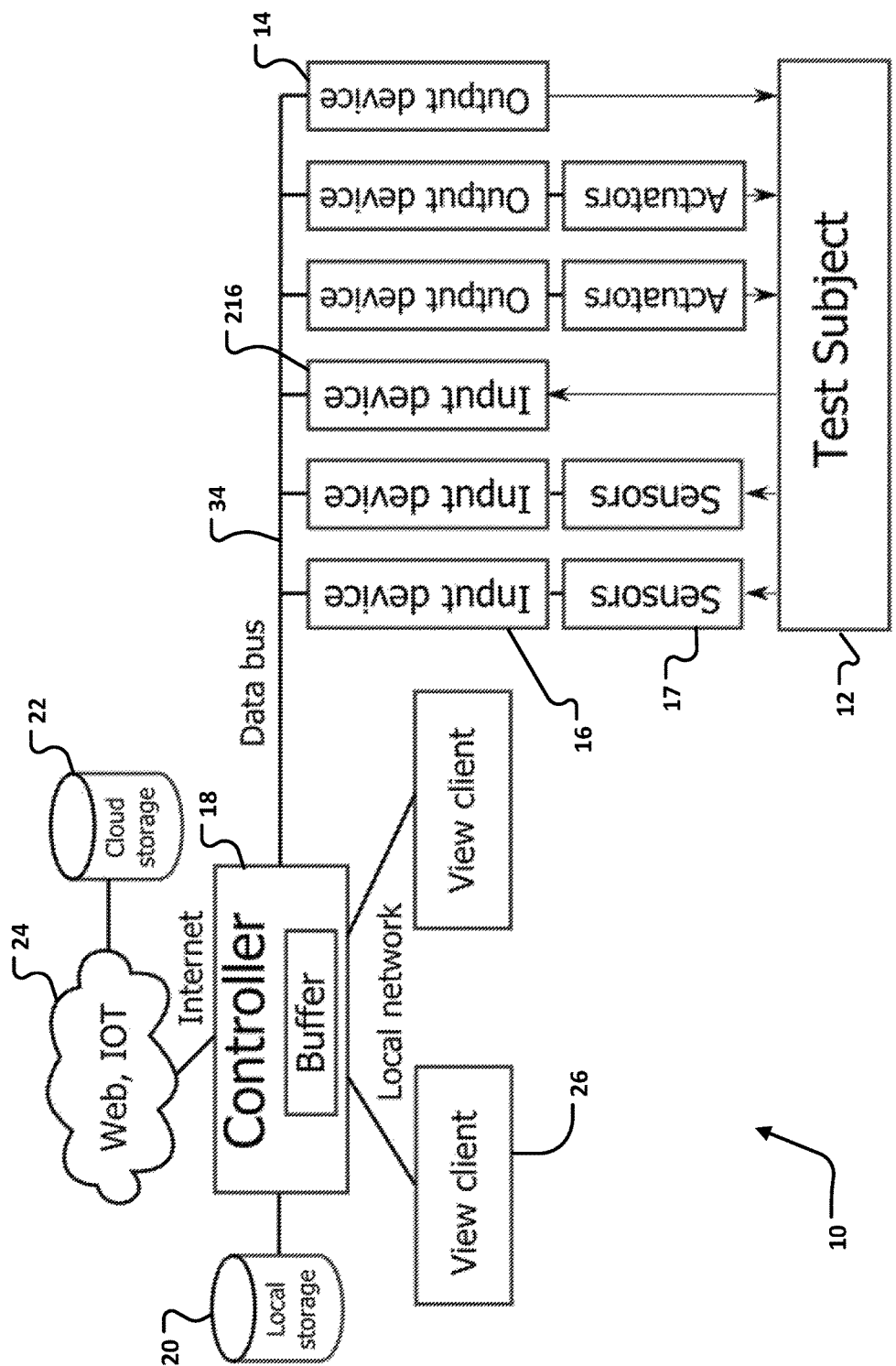
FIG. 1 is a schematic of a first operating environment incorporating a first exemplary embodiment of the present disclosure.

A plurality of different embodiments of the present disclosure is shown in the Figures of the application. Similar features are shown in the various embodiments of the present disclosure. Similar features across different embodiments have been numbered with a common reference numeral and have been differentiated by an alphabetic suffix. Similar features in a particular embodiment have been numbered with a common two-digit, base reference numeral and have been differentiated by a different leading numeral. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The present disclosure, as demonstrated by the exemplary embodiments described below, can provide a system for equidistant buffered data acquisition and just-in-time data retrieval from a controller. Embodiments of the present disclosure can provide a dual controller mode, with fast data retrieval and transmission for quick reactions and buffer reconstruction for a view client on the controller side. The data retrieval can also be utilized for data acquisition, storage and advanced mathematics. Embodiments of the present disclosure can provide methods for synchronized data acquisition through a plurality of input channels. Retransmit methods can be applied for retrieving lost data packages. Embodiments of the present disclosure can provide the use of a buffered data stream in control applications.

The principles of merging data acquisition and a control system are presented by the embodiments of the present disclosure. An exemplary system consists of a controller executing both data acquisition and control of task input devices. The controller can control one or more output devices and receive data from input devices such as sensors. The data from sensors can be received directly by the controller or through a data acquisition device.

Referring now to FIG. 1, a system 10 can be utilized in a data acquisition (DAQ) process. The system 10 can acquire and process data generated by the testing of a test subject 12. The test subject 12 can be a unitary, homogenous quantity of matter or can be an assembly of a plurality of distinct components.

Input devices, such as input device 16, can communicate with the system 10. An input device such as input device 16 can sense physical phenomena associated with the test subject 12 or can received signals associated with sensed physical phenomena and emit signals corresponding to the sensed physical phenomena. Exemplary input devices such as input device 16 can be a temperature sensor, a proximity sensor, a potentiometer, or a strain gauge, by way of example and not limitation. An input device such as input device 16 can also be a data acquisition device receiving signals from a sensor, such as sensor 17. An input device such as input device 216 can be directly associated with the test subject 12. An exemplary data acquisition device that can send signal data samples to a controller and can include a front-end amplifier to acquire different measurement parameters (such as, but not limited to voltage, current, pressure, strain, force, pressure, vibration, sound), an analog to digital converter, and a processor unit which acquires the signals, prepares the signal for transmission to controller and stores the data to temporary buffer which is used to retransmit the missing samples to the controller. The processor can handle the communication with the controller. One example of an input device that can be utilized in an example of the present disclosure is a DEWESoft Krypton model, produced by the Applicant.

Output devices, such as output device 14, can act on the test subject 12. The output device 14 can be an actuator applying a physical load on the test subject 12. Exemplary output devices such as output device 14 can be (or can be connected to) an actuator, a motor, an applicator of compressive or tensile loading, or any other device that can change at least one condition of the test subject 12 such as position, motion, or loading. The output device 14 can receive electrical signals and change operation in response to the receipt of those electrical signals. As used herein, "in response to" does not simply mean "subsequent to," but is synonymous to "at least partially as a consequence of."

The system 10 can include a controller 18 having one or more processors. The controller 18 can receive signal data samples from the input devices over a data bus 34. In response to receiving the signal data samples from the input devices, the controller 18 can process the signal data samples and determine an appropriate command to one or more of the output devices. The controller 18 can transmit command signals to one or more output devices over the data bus 34 and, in response, the output devices can change or maintain the attributes of its operation. Alternatively, in one or more embodiments, the controller 18 can transmit signal data samples directly to an output device that itself can process the signal data samples and determine if a change in operation should occur.

In addition to actively monitoring the condition of the test subject 12 and controlling the output devices in real time, the controller 18 can also store the signal data samples received from the input devices. The controller 18 can store the signal data samples to local storage 20. The controller 18 can also store the signal data samples to cloud storage 22, transmitting the signal data samples over a network 24. The network 24 can include a local area network (LAN), a wide area network (WAN), e.g., the Internet, or a combination thereof.

Storage 20 or 22 can be defined in various ways in implementations of the present disclosure. Storage 20 or 22 can include computer readable storage media and communication media. Storage 20 or 22 can be non-transitory in nature, and may include non-volatile, and removable and non-removable media implemented in any method or technology for storage of information, such as computer-readable instructions, data structures, program modules or other data. Storage 20 or 22 can further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the controller 18. Storage 20 or 22 can store computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

The controller 18 can also receive requests for data from other devices, such as a view client 26, or can be configured to transmit data in response to various conditions, such as the complete or partial mapping of data to a buffer. View client 26 can be another computing device or can be a display. The view client 26 can be local or remote. A remote view client is a view client that can be physically remote from the lab at which testing is occurring but in the same building or can be physically remote from the building in which the test is occurring or has occurred. Data acquired over a period of time can be transmitted to the view client 26 by the controller 18. The view client 26 can display the data to a user, such as in the form of wave graphs. Thus, in at least some operating environments and some embodiments, a series of data received over time is desirable for display purposes rather than instantaneous data.

Figure 2:
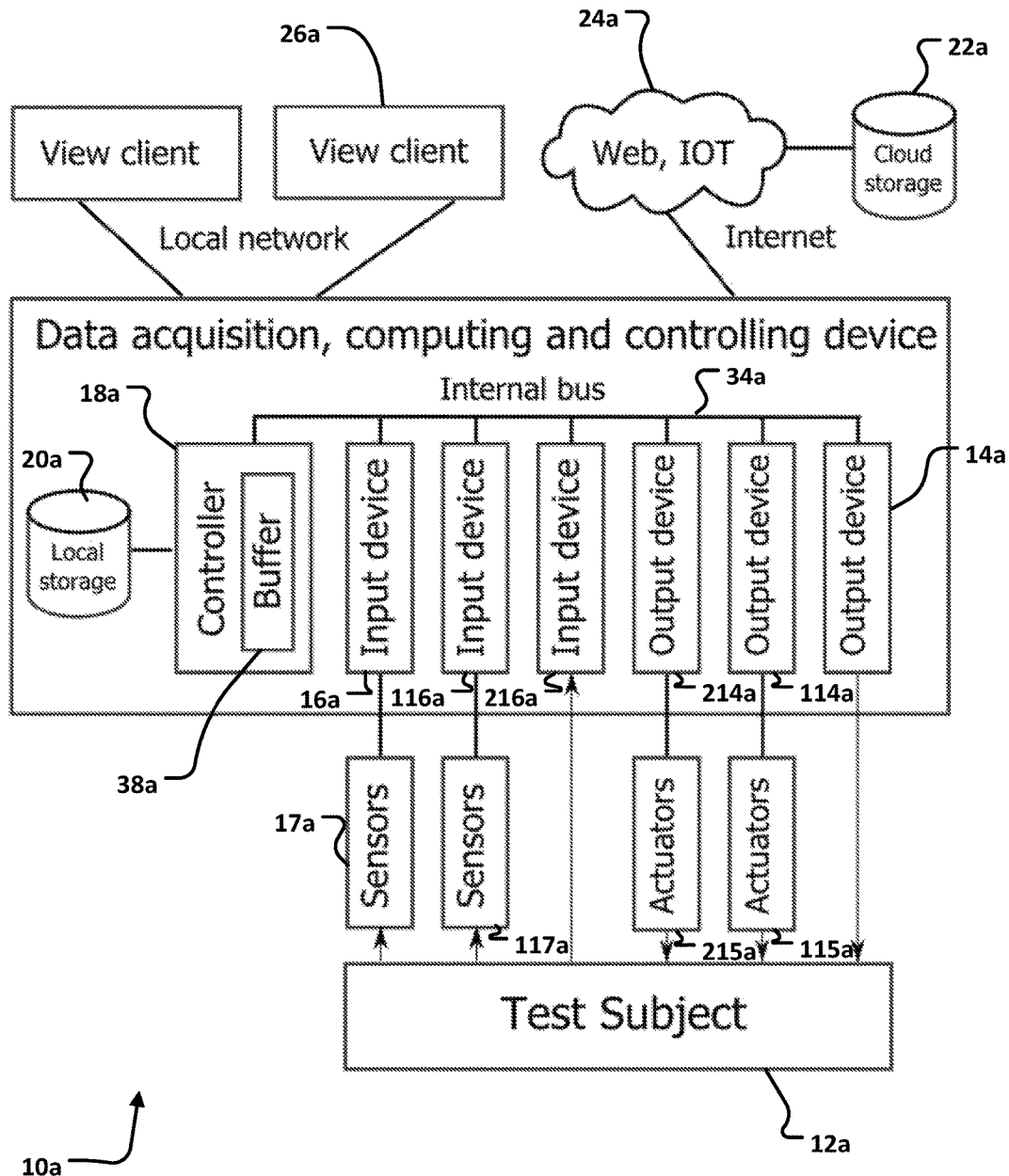
FIG. 2 is a schematic of a second operating environment incorporating a second exemplary embodiment of the present disclosure.

Referring now to FIG. 2, a system 10a can be utilized in a data acquisition (DAQ) process. The system 10a can acquire and process data generated by the testing of a test subject 12. The test subject 12a can be a unitary, homogenous quantity of matter or can be an assembly of a plurality of distinct components.

Input devices, such as input device 16a, can communicate with the system 10a. An input device such as input device 16a can be a data acquisition device receiving signals from a sensor 17a. The sensor 17a can sense physical phenomena associated with the test subject 12a and emit signals corresponding to the sensed physical phenomena. Exemplary sensors can be a temperature sensor, a proximity sensor, a potentiometer, or a strain gauge, by way of example and not limitation. The input device 16a can receive the signals from the sensor 17a and send signal data samples to a controller 18a. The input device 16a can consist of a front end amplifier to acquire different measurement parameters (such as, but not limited to voltage, current, pressure, strain, force, pressure, vibration, sound), an analog to digital converter, and a processor unit which acquires the signals, prepares the signal for transmission to controller and stores the data to temporary buffer which is used to retransmit any missing samples to the controller 18a. The processor of the input device 16a can handle the communication with the controller 18a.

Output devices, such as output device 14a, can act on the test subject 12a. The output device 14a can be an actuator applying a physical load on the test subject 12a. The exemplary output device 14a can act directly on the test subject 12a. Exemplary output devices such as output device 114a can be connected to an actuator, such as actuator 115a. Examples of actuators that can be utilized in one or more embodiments of the present disclosure include a motor, an applicator of compressive or tensile loading, or any other device that can change at least one condition of the test subject 12a such as position, motion, or loading. The output device 14a can receive electrical signals and change operation in response to the receipt of those electrical signals.

The system 10a can include the controller 18a. The controller 18a can receive signal data samples from the input devices over an internal data bus 34a. In response to receiving the signal data samples from the input devices, the controller 18a can process the signal data samples and determine an appropriate command to one or more of the output devices. The controller 18a can transmit command signals to one or more output devices over the internal data bus 34a and, in response, the output devices can change or maintain the attributes of its operation. Alternatively, in one or more embodiments, the controller 18a can transmit signal data samples directly to an output device that itself can process the signal data samples and determine if a change in operation should occur. One example of a device that be modified in accordance with the present disclosure and then utilized for a controller in an example of the present disclosure is a DEWESoft R8 model, produced by the Applicant.

In addition to actively monitoring the condition of the test subject 12a and controlling the output devices in real time, the controller 18a can also store the signal data samples received from the input devices. The controller 18a can store the signal data samples to local storage 20a. The controller 18 can also store the signal data samples to cloud storage 22a, transmitting the signal data samples over a network 24a. The network 24a can include a local area network (LAN), a wide area network (WAN), e.g., the Internet, or a combination thereof.

The controller 18a can also receive requests for data from other devices, such as a view client 26a, or can be configured to transmit data in response to various conditions, such as the complete or partial mapping of data to a buffer. View client 26a can be another computing device or can be a display. The view client 26a can be local or remote. Data acquired over a period of time can be transmitted to the view client 26a by the controller 18a. The view client 26a can display the data to a user, such as in the form of wave graphs. Thus, in at least some operating environments and some embodiments, a series of data received over time is desirable for display purposes rather than instantaneous data.

The system 10 or the system 10a can be utilized in a data acquisition (DAQ) process. Each system is configured to transfer at least a portion of signal data samples associated with an iterative, equidistant and synchronized, time-based data acquisition (DAQ) operation to at least one output device. Referring once more to FIG. 2, in on exemplary operation, the test subject 12a can be acted upon by the output devices 14a, 114a, 214a, each respectively connected to and controlling actuators 115a, 215a. Input devices 16a, 116a, 216a communicate with sensors 17a, 117a, that can sense physical phenomena associated with the test subject 12a and emit respective signal data samples corresponding to the sensed physical phenomena arising based on the operation of the output devices 14a, 114a, 214a and actuators 115a, 215a. Input device 16a and sensor 17a have been designated as signal data sample S1, input device 116a and sensor 117a have been designated as signal data sample S2, and input device 216a has been designated as signal data sample S3. S1, S2 and S3 collectively define a "signal" received by the controller 18a. S1, S2, and S3 are acquired by the input devices 16a, 116a, 216a at the same time (at the same clock cycle) and are sent to the controller 18a on request. This signal is referenced at 36a in FIG. 3. All of the input devices 16a, 116a, 216a are in electrical communication with the controller 18a and can therefore communicate signal data samples to the controller 18a.

The input devices 16a, 116a, 216a can process the respective signal data samples received from the sensors 17a, 117a and received directly for input device 216a. For example, the input devices 16a, 116a, 216a can filter, amplify or apply some other treatment to the signal data samples. After processing the signal data samples to enhance signal quality, the input devices 16a, 116a, 216a can transmit the signal data samples to the controller 18a.

The input devices 16a, 116a, 216a and the controller 18a can operate according to a common clock. As a result, the input devices 16a, 116a, 216a can acquire signal data samples and transmit signal data samples to the controller 18a at a predetermined interval. Further, the input devices 16a, 116a, 216a can receive signal data samples from the sensors 16a, 116a, 216a at the predetermined interval. The interval between each transmission can be equidistant. Each transmission between the input devices 16a, 116a, 216a and the controller 18a can include a signal data sample associated with each of the sensors 17a, 117a. Each transmission from one of the input devices 16a, 116a, 216a to the controller 18a is an instance of a signal data sample.

Figure 3:
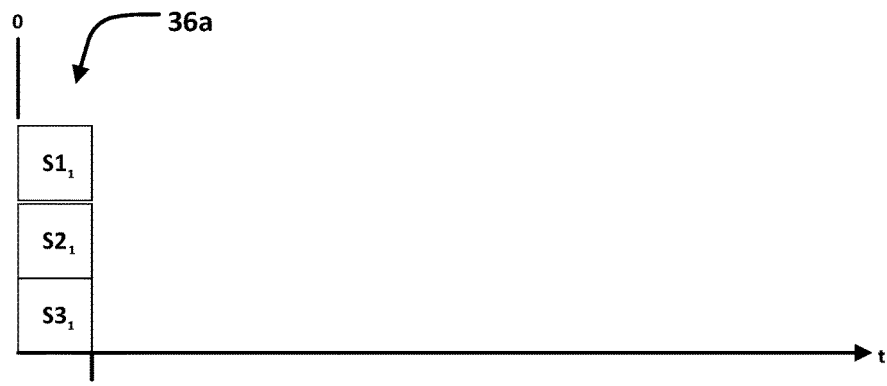
FIG. 3 is a first schematic of the mapping of signal data sample to a first buffer according to one or more embodiments of the present disclosure.
Figure 4:
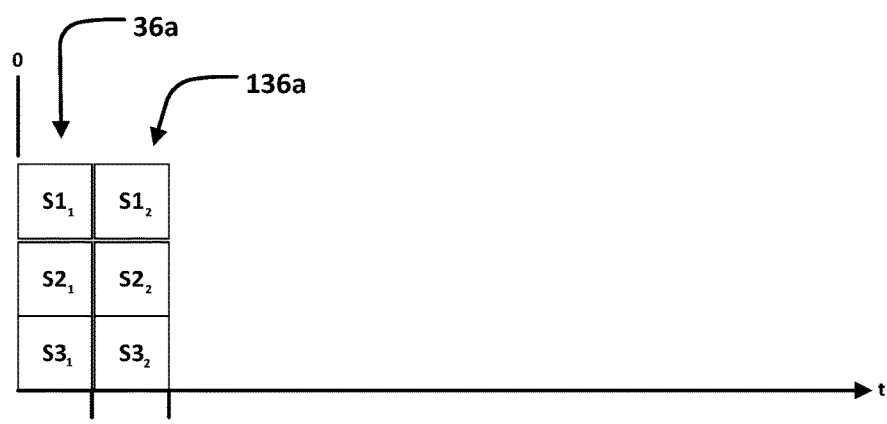
FIG. 4 is a second schematic of the mapping of signal data sample to the first buffer according to one or more embodiments of the present disclosure.
Figure 5:
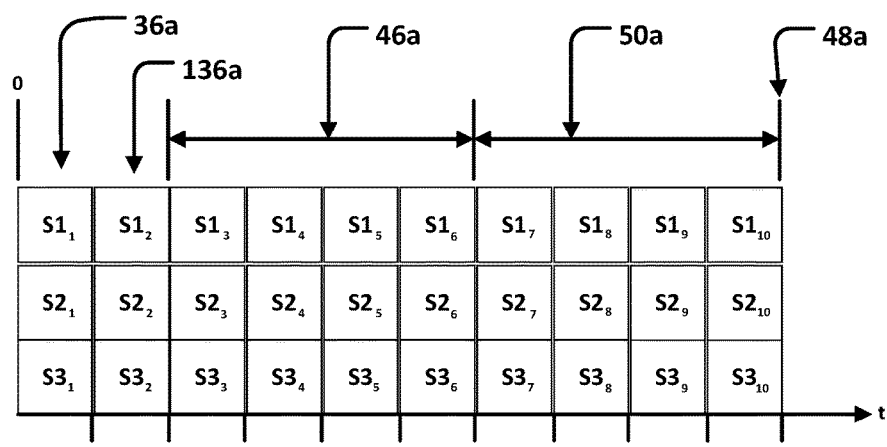
FIG. 5 is a third schematic of the mapping of signal data sample to the first buffer according to one or more embodiments of the present disclosure.

FIG. 3 is graphical representation of a single instance of a composite signal 36a, containing respective first signal data samples generated by input devices/sensors. The references S1, S2, and S3 have been applied in FIG. 3 and correspond to the signal data samples emitted by the input devices 16a, 116a, 216a. FIG. 4 is graphical representation of a series of two instances of composite signals 36a and 136a, each including three signal data samples. Subscripts have been used to distinguish the signal data samples S and composite signals 36a and 136a. The subscript "1" is associated with the first instance of a composite signal 36a and first instances of signal data samples S1, S2 and S3. The subscript "2" is associated with the second instance of a composite signal and signal data samples. The second instance of a signal data sample was transmitted to the controller 18a from the input devices 16a, 116a, 216a after the predetermined equidistant interval of time (the cycle or clock time) from the time that the first instance of a signal data sample was transmitted to the controller 18a from the input devices 16a, 116a, 216a. FIG. 5 is graphical representation of a series of ten instances of composite signals and associated signal data samples. While blocks are used to represent the signal data sample, each block should not necessarily be viewed as a bit.

The controller 18a can request and receive, in real time, the composite signals 36a, 136a of the time-based DAQ operation or any of the individual signal data samples associated with the composite signals 36a, 136a from the input devices 16a, 116a, 216a. The controller 18a can map each instance of received composite signal 36a, 136a to a buffer 38a. The requesting and receiving is repeated after each predetermined equidistant interval (each clock cycle).

The controller 18a can compare a time indicator of each of the series of received composite signals and individual signal data samples against a time indicator of a previously-received signal data sample to confirm that no signal data sample is lost. In other words, some portion of a current signal data sample can indicate the time associated with that signal data sample or that signal data sample's position in an order of signal data samples. The time or order indicator can be a timestamp or an incremental sample identification. The controller 18a can confirm that the current signal data sample is the next signal data sample that should have been received.

If a signal data sample is missing, the controller 18a can request the relevant input device to retransmit the missing signal data sample in response to the comparing process if one of the signal data samples is lost. The relevant input device can transmit the missing signal data sample to the controller in response to receiving the request for the missing signal data sample from the controller 18a. The controller 18a can receive from the relevant input device the missing signal data sample.

The controller 18a can map the series of the received signal data samples to the buffer 38a as the requesting and receiving is repeated after each predetermined and equidistant time intervals. Remapping of the series of signal data samples in the buffer 38a can be performed by the controller to arrange the series in time sequence. For example, FIGS. 3-5 schematically illustrate the mapping of the buffer 38a. Each instance of signal data sample, such as 36a and 136a, is placed in the buffer 38a in incremental order. This is shown by the use of incremental subscripts.

Figure 6:
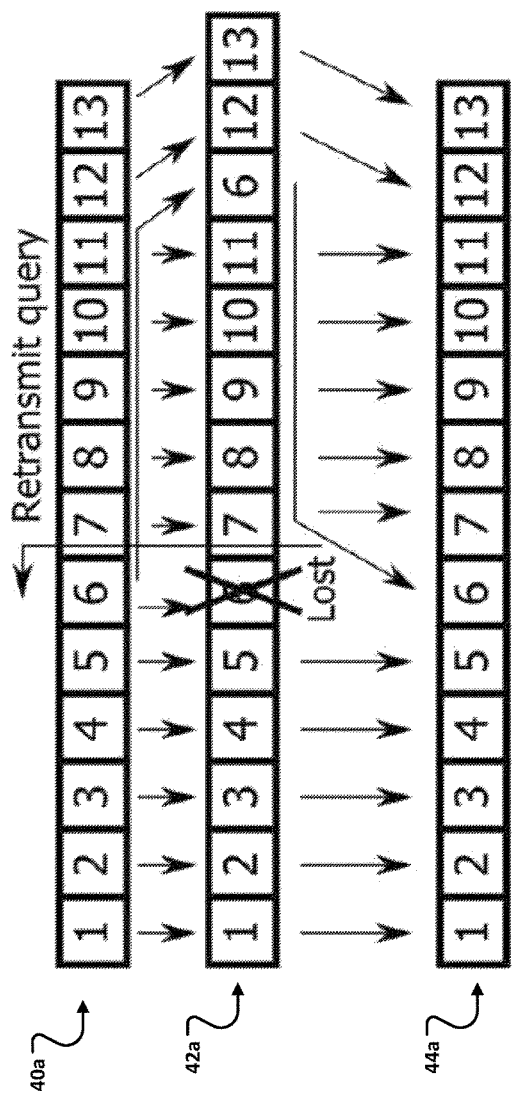
FIG. 6 is a schematic of the receipt of a series of signal data sample by a controller from a data acquisition device and the subsequent mapping of the series of signal data sample to a first buffer by the controller.

FIG. 6 is a schematic of the receipt of a series of signal data samples by the controller 18a from the input devices 16a, 116a, 216a and the subsequent mapping of the series of signal data sample to the buffer 38a by the controller 18a. FIG. 6 also illustrates the result when the controller 18a receives a signal data sample that is not incrementally-next in time relative to the immediately-proceeding signal data sample, such as when a signal data sample is lost during transmission. In FIG. 6, each box represents an instance of signal data sample. Each box is numbered incrementally based on time; the box marked "2" is a second instance of signal data sample and is incrementally-next in time relative to the immediately-proceeding signal data sample in the box marked "1." The box marked "1" can correspond to the signal data sample 36a in FIGS. 3-5 and the box marked "2" can correspond to the signal data sample 136a in FIGS. 3-5.

The row of boxes referenced at 40a corresponds to the input devices 16a, 116a, 216a. This row 40a corresponds to the signals received from the sensors 17a, 117a and to the data that is to be communicated to the controller 18a. The row of boxes referenced at 42a corresponds to the controller 18a. This row 42a corresponds to the series of signal data samples received by the controller 18a from the input devices 16a, 116a, 216a. The row 42a corresponds to a "preliminary" mapping for the buffer 38a. The row of boxes referenced at 44a corresponds to the "final" mapping of the buffer 38a. The order set forth in line 44a is mapped to, or stored in, the buffer 38a.

FIG. 6 illustrates the course of an exemplary transmission/receipt of instances of signal data samples. The course proceeds without error until the sixth instance of signal data sample. After receiving each instance of signal data sample from the first instance to the fifth instance, the controller 18a maps each instance of signal data sample to the buffer 38a.

After receiving the fifth instance of signal data sample, the controller 18a next receives the seventh instance of signal data sample. The controller 18a delays further mapping of the buffer 38a in response to receiving the seventh instance of signal data sample after receiving the fifth instance of signal data sample without receiving the sixth instance of signal data sample. In the exemplary row 42a, the sixth signal data sample was lost but the signal data samples can continue to be sent to and received by the controller 18a (see boxes marked 7-11 of row 42a) as the lost signal data sample 6 is retrieved. The controller 18a can transmit a retransmit request to whichever input device 16a, 116a, 216a associated with the lost signal data sample, in response to receiving the seventh instance of signal data sample after receiving the fifth instance of signal data sample without receiving the sixth instance of signal data sample. The retransmit request is transmitted to retrieve the missing signal data sample (the sixth instance of signal data sample).

The controller 18a continues to receive instances of signal data sample until the reply to the retransmit query is received. These instances of signal data sample are not mapped to the buffer 38a until the reply to the retransmit query is received. In the exemplary embodiment, the controller 18a can store the seventh through eleventh instances of signal data sample in local memory until receiving the sixth instance of signal data sample. Upon receiving the sixth instance of signal data sample, the controller 18*a* can resume mapping of the buffer 38*a* and map the sixth-eleventh instances of signal data sample. The data bus 34*a* should not be fully loaded to allow retransmission of lost signal data samples and also to allow real-time transmission of current signal data samples.

The controller 18*a* can control one or more of the output devices, such as the output device 14*a*, in response to receiving the present signal data sample, even if a prior signal data sample is lost. The output device 14*a* can be controlled based on the present or current signal data sample associated with one or more of the sensors 16*a*, 116*a*, 216*a*, even if the current signal data sample is not incrementally-next relative to the preceding signal data sample that was received. The controller 18*a* can transmit in real time, to the at least one output device, at least a portion of the present signal data sample prior to receiving a missing signal data sample from the input devices 16*a*, 116*a*, 216*a*. This allows the output devices 14*a*, 114*a*, 116*a* to respond as needed in real time.

In one or more embodiments, the controller 18*a* can correlate the present signal data sample against a predetermined value and then transmit a command to the first output device 14*a* in response to the correlating. For example, if the signal data sample is indicative of a speed of rotation of the test subject 12*a* and the signal data sample indicates that the test subject 12*a* is not rotating at a desired speed, the controller 18*a* can control the output device 14*a* to increase rotation speed. With reference to the paragraph above and to FIG. 6, if the controller 18*a* receives the seventh instance of signal data sample after receiving the fifth instance of signal data sample without receiving the sixth instance of signal data sample, and the seventh instance of signal data sample indicates that the test subject 12*a* is not rotating at a desired speed, the controller 18*a* can control the output device 14*a* to increase rotation speed while retrieving the sixth instance of signal data sample. The control of the output device 14*a* would be based on the seventh instance of signal data sample. Thus, the output device 14*a* can be controlled by the controller 18*a* regardless of an outcome of comparing two, successively-received signal data samples to ensure no signal data sample is lost.

In one or more embodiments, the controller 18*a* can transmit at least a portion of the present signal data sample to the first output device. For example, instead of processing (applying logic) to part or all of a signal data sample, the controller 18*a* can be configured to transmit the signal data samples to the output device 14*a*. The output device 14*a* can process signal data samples to determine if a change in operation is necessary.

By way of example and not limitation, the sensor 17*a* can be a strain gauge and a present or current signal data sample transmitted the controller 18*a* by the input device 16*a* can indicate that the test subject 12*a* is under a load of fifty newtons. In one or more embodiments of the present disclosure, the controller 18*a* can correlate the present signal data sample against a predetermined value and then transmit a command to the first output device 14*a* in response to the correlating. For example, the controller 18*a* can correlate the indication of fifty newtons against a predetermined value such as three hundred newtons (a desired value) and then transmit a command to the first output device 14*a* to increase load acting on the test subject 12*a* in response to the correlating. In one or more embodiments, the controller 18*a* can simply transmit the signal indicating fifty newtons of load on the test subject 12*a* to the first output device 14*a* and the first output device 14*a* can process the signal, such as by correlating and changing or confirming operation.

The exercise of control over the output device 14*a* by the controller 18*a*, by transmitting a command or a portion of the signal data sample, occurs regardless of an outcome of the comparing set forth above. The controller 18*a* is a dual mode controller and can map the buffer 38*a* while also controlling the output device 14*a*, doing both based on the buffered data stream from the input devices 16*a*, 116*a*, 216*a*. The controlling (the transmission of a command or a portion of the signal data sample) can occur during the delaying (while mapping is delayed). The controller 18*a* can thus change the operation of the first output device 14*a* as the mapping of the buffer 38*a* (line 44*a* in FIG. 6) is delayed. The controlling of the first output device 14*a* and the retrieving of a missing signal data sample can be performed substantially concurrently with one another. The controlling of the first output device 14*a*, the retrieving of a missing signal data sample, and the delaying of mapping can be performed substantially concurrently with one another.

Figure 7:
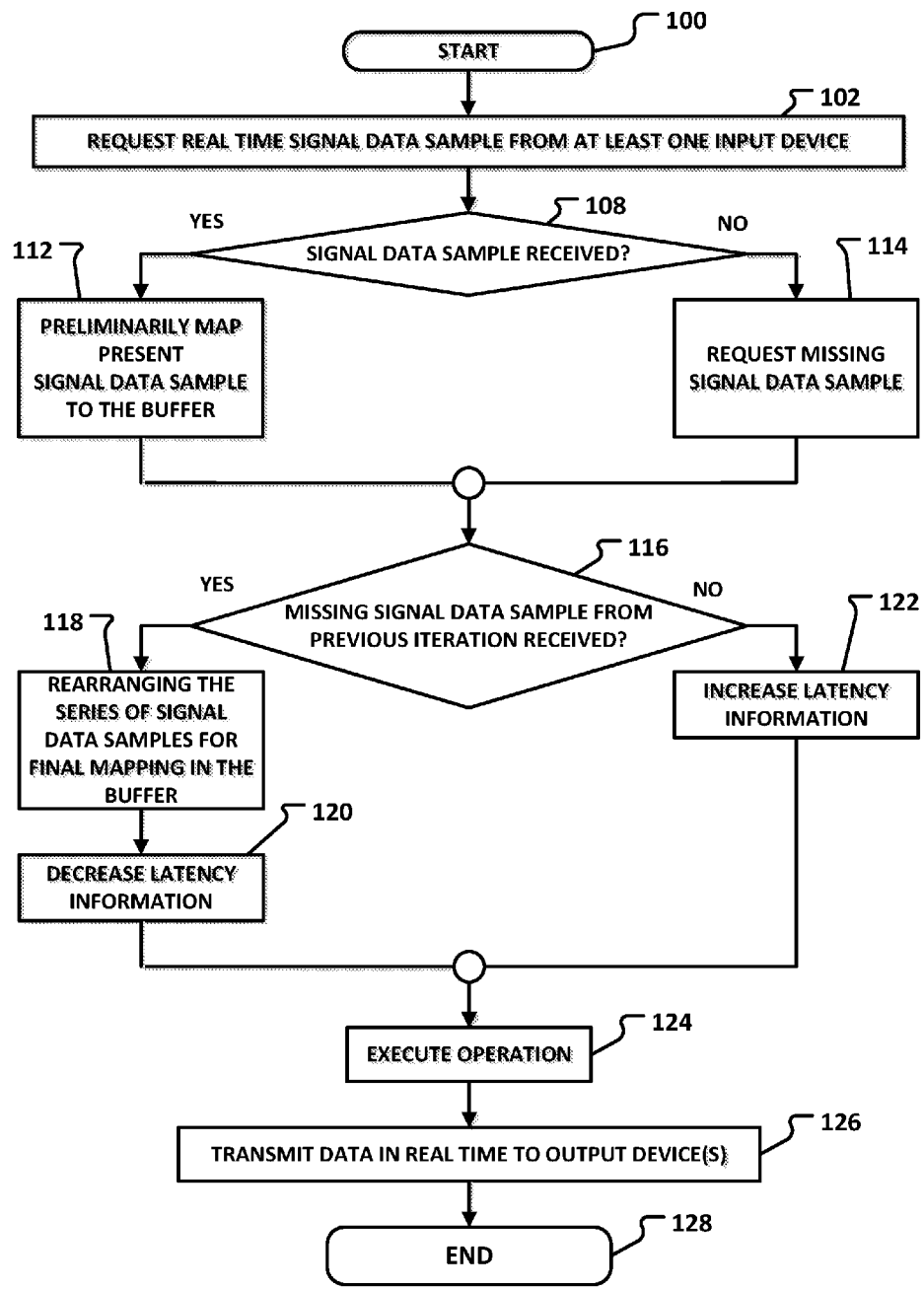
FIG. 7 is a first exemplary flow diagram according to one or more embodiments of the present disclosure.
Figure 8:
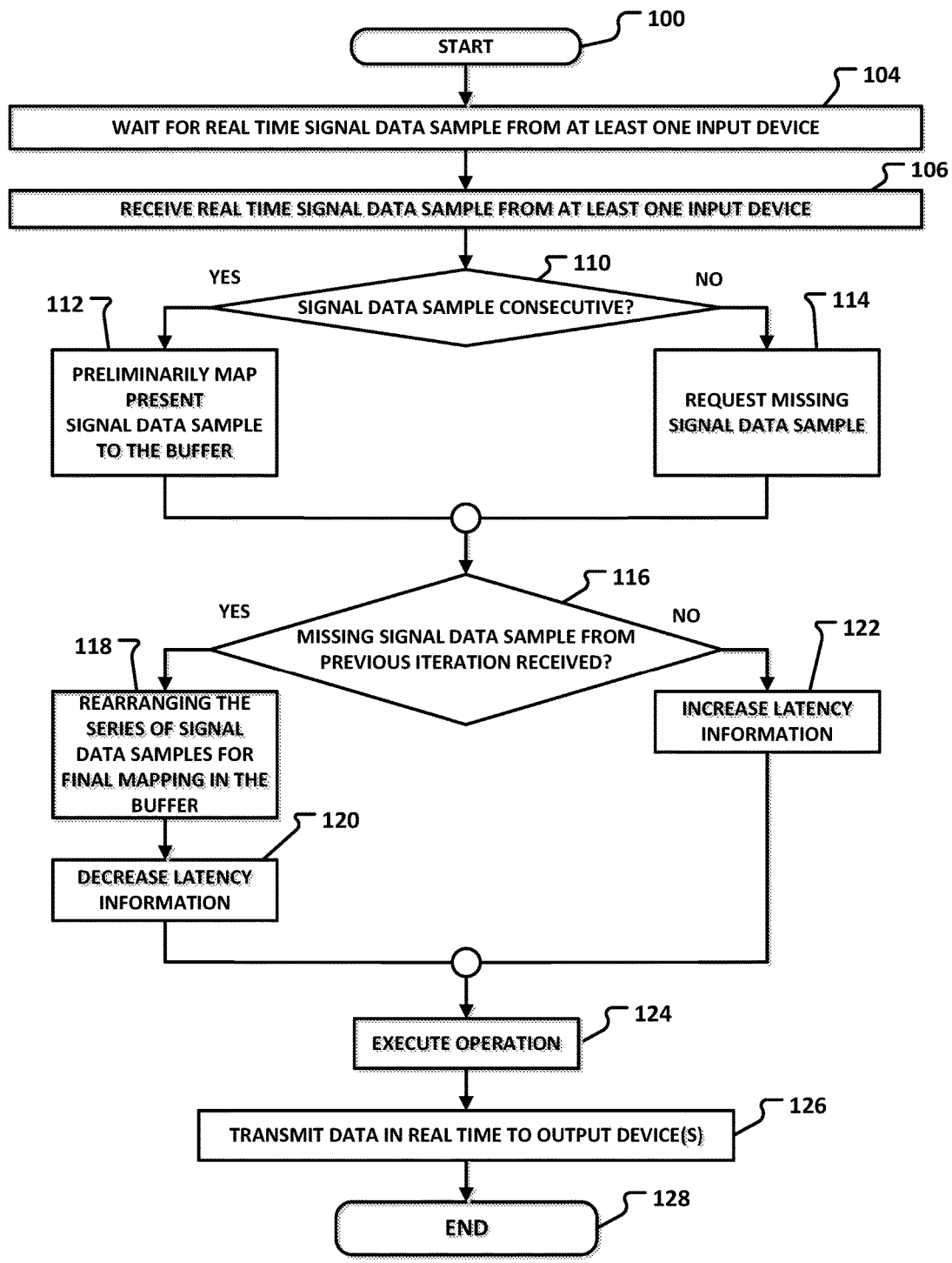
FIG. 8 is a second exemplary flow diagram according to one or more embodiments of the present disclosure.

FIGS. 7 and 8 are flow charts illustrating various methods that can be carried out in some embodiments of the present disclosure. The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical functions. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The method illustrated in FIG. 7 can be executed by the system 10 or the system 10*a*. The method starts at 100. At 102, the controller having one or more processors, in real time, requests a signal data sample from one or more input devices. The signal data sample is taken as part of a time-based DAQ operation and is requested from an input device associated with a test subject at a predetermined equidistant interval.

At 108, the controller determines if the signal data sample requested at 102 was received. The controller may determine that the signal data sample was not received at the expiration of the next clock cycle or some other predetermined number of clock cycles. If the present signal data sample was received, the process continues to 112. At 112, the present signal data sample is preliminarily mapped to the buffer. If the present signal data sample was not received, the process continues to 114. At 114, the missing signal data sample is requested from the input device by the controller.

Proceeding from 112 or 114, the controller proceeds to 116, and determines if a missing signal data sample from a previously iteration of the flow diagram has been received. If a signal data sample that had been missing in a previously iteration has been received, the controller proceeds to 118 and the buffer is rearranged. The line 44a in FIG. 6 corresponds to 118 in FIG. 7. The controller can also decrease latency information following 118, at 120. If a signal data sample that had been missing in a previously iteration has not been received, the controller can increase latency information following 116, at 122. Steps 116, 118, 120, 122 are not required if all signal data samples previous to the present signal data sample have been received.

At 124, the controller can execute an operation on the signal data sample or on the series of signal data samples. At 126, the controller can transmit data in real time to one or more output devices. As shown by the exemplary flow diagram, data can be transmitted to an output device regardless of whether a present signal data sample is missing or whether a signal data sample from a previous iteration remains missing. After 126, the exemplary method ends at 128. It is noted that the exemplary method illustrated in FIG. 7 is one iteration of a method that is repeated during the DAQ operation.

The method illustrated in FIG. 8 can also be executed by the system 10 or the system 10a. The method starts at 100. At 104, the controller having one or more processors, in real time, waits for a signal data sample from one or more input devices. The signal data sample is taken as part of a time-based DAQ operation and is emitted by an input device associated with a test subject at a predetermined equidistant interval. At 106, the controller receives the signal data sample.

At 110, the controller determines if the signal data sample received at 106 is consecutive relative to the previously received signal data sample. If the present signal data sample is incrementally-next in time relative to the immediately-proceeding signal data sample, the process continues to 112. At 112, the present signal data sample is preliminarily mapped to the buffer. If the present signal data sample was not received, the process continues to 114. At 114, the missing signal data sample is requested from the input device by the controller.

Proceeding from 112 or 114, the controller proceeds to 116, and determines if a missing signal data sample from a previously iteration of the flow diagram has been received. If a signal data sample that had been missing in a previously iteration has been received, the controller proceeds to 118 and the buffer is rearranged. The line 44a in FIG. 6 corresponds to 118 in FIG. 8. The controller can also decrease latency information following 118, at 120. If a signal data sample that had been missing in a previously iteration has not been received, the controller can increase latency information following 116, at 122. Steps 116, 118, 120, 122 are not required if all signal data samples previous to the present signal data sample have been received.

At 124, the controller can execute an operation on the signal data sample or on the series of signal data samples. At 126, the controller can transmit data in real time to one or more output devices. As shown by the exemplary flow diagram, data can be transmitted to an output device regardless of whether a present signal data sample is missing or whether a signal data sample from a previous iteration remains missing. After 126, the exemplary method ends at 128. It is noted that the exemplary method illustrated in FIG. 8 is one iteration of a method that is repeated.

In one or more embodiments of the present disclosure, the controller 18a can transmit the contents of the buffer 38a to another device after the mapping, such as the view client 26a. The view client 26a can be another computing device having a display or merely a display. The view client 26a is in electrical communication with the controller 18a and can display the series of signal data samples. The contents of the buffer 38a can include a plurality of signal data samples, such as a series of signal data samples. The controller 18a can control the output devices 14a, 114a, 214a during the transmission of the contents of the buffer 38a to the view client 26a.

FIG. 5 is an illustration associated with the transmission of the contents of the buffer 38a to the view client 26a after the mapping. The contents of the buffer 38a are referenced at 46a. In the exemplary embodiment, instances of signal data sample referenced at $SX_3$-$SX_6$ (wherein x=1, 2, 3) are transmitted to the view client 26a. In the exemplary embodiment, when four consecutive instances of signal data sample have been mapped to the buffer 38a, those four consecutive instances of signal data sample can be transmitted to or fetched by the view client 26a. It is noted that in this exemplary description, the current or present signal data sample is referenced at 48a. In other words, $S1_{10}$ and $S2_{10}$ define the exemplary present signal data sample; each of $S1_{10}$, $S2_{10}$ and $S3_{10}$ are received by the controller 18a from different input devices 16a, 116a, 216a and cooperatively define a single signal data sample. The exemplary read latency as between the controller 18a and the finally-mapped buffer 38a is referenced at 50a.

In one or more embodiments of the present disclosure, the controller 18a can request and receive asynchronous signal data samples from one or more of the input devices 16a, 116a, 216a. An asynchronous signal data sample is a signal data sample that is acquired by one the input devices 16a, 116a, 216a at a time interval that is not predetermined and/or constant. The controller 18a can correlate a time stamp or an index number for each asynchronous signal data sample with the time indicator of one or more of the synchronous signal data samples to confirm the order of signal data samples. The controller 18a can request from the appropriate input device any missing asynchronous signal data samples. Missing signal data sample can be transmitted to the controller 18a from a sample index of the appropriate input device in response to the request for the missing signal data sample.

In one or more embodiments of the present disclosure, the controller (18 or 18a) can execute operations on an equidistant or non-equidistant time history of the signal data samples. A history is equidistant in time if the signal data samples are taken at the same time interval (the clock cycle). A history is non-equidistant in time if the signal data samples are not taken at the same time interval.

A number of different operations can be executed. Examples of possible operations include algebraic operations, trigonometric operations, alarm threshold comparison, and triggering on a single received signal data sample resulting in one output data sample. Examples of other possible operations include filtering, derivation, integration, statistics, FFT analysis, octave analysis, correlation, and PID control on a plurality of received signal data samples resulting in one output data sample. Operations on a plurality of received signal data samples introduce latency to the analysis. The operations can be executed and performed in real time. An output device can be controlled in response to the execution of the operation.

Each signal can include latency information arising due to the rearranging done for the final mapping of the series of signal data samples. For example, referring again to FIG. 5, the latency associated with the composite signal 136a is measured along the horizontal axis from the present signal data sample referenced at 48a (eight clock cycles). The output result can include latency information associated with both of the delay in retrieving missing signal data samples and also a delay arising due to the executing. The output result can include a first output delayed by the rearranging of the composite signals or signal data samples for the final remapping and a second output emitted prior to the rearranging and therefore not delayed.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or subcombinations that are disclosed herein as other present disclosures in other patent documents is hereby unconditionally reserved.

What is claimed is:

1. A method for configuring a transfer of signals associated with an iterative and synchronized, time-based data acquisition (DAQ) operation between at least one input device and at least one output device, the method comprising:
   requesting and receiving, at a controller having one or more processors, in real time, signal data samples from the at least one input device;
   preliminarily mapping, with the controller, a series of the received signal data samples to a buffer as said requesting and receiving is repeated after predetermined and equidistant time intervals;
   comparing with the controller a time indicator of each of the series of received signal data samples against a time indicator of a previously-received signal data sample to confirm that no signal data sample is lost;
   requesting from the at least one input device with the controller a missing signal data sample in response to said comparing if one of the signal data samples is lost;
   transmitting the missing signal data sample to the controller from the at least one input device in response to said requesting the missing signal data sample;
   receiving at the controller, from the at least one input device, the missing signal data sample in response to said transmitting;
   rearranging the series of signal data samples for final mapping in the buffer with the controller to arrange the series in time sequence; and
   transmitting in real time, with the controller, to the at least one output device, at least a portion of a present signal data sample prior to said receiving the missing signal data sample by the controller.

2. The method of claim 1 further comprising:
   displaying, on a display in communication with the controller, the series of received signal data samples after said rearranging.

3. The method of claim 1 wherein the time indicator is further defined as a timestamp or an incremental sample identification.

4. The method of claim 1 further comprising:
   requesting and receiving, at the controller, asynchronous signal data samples from the at least one input device.

5. The method of claim 4 further comprising:
   correlating, with the controller, a timestamp of each asynchronous signal data samples received from the at least one input device with the time indicator of one or more of the signal data samples.

6. The method of claim 5 further comprising:
   requesting from the at least one input device with the controller a missing asynchronous signal data sample;
   transmitting the missing signal data sample to the controller from a sample index of the at least one input device in response to said requesting the missing signal data sample; and
   receiving at the controller, from the at least one input device, the missing asynchronous signal data sample.

7. The method of claim 1 further comprising:
   executing, with the controller, operations on an equidistant or non-equidistant time history of the signal data samples.

8. The method of claim 7 wherein said executing is further defined as:
   executing, with the controller, operations including at least one of:
   (i) an operation that does not introduce latency consisting of at least one of algebraic operations, trigonometric operations, alarm threshold comparison, triggering on a single received signal data sample, or
   (ii) an operation that does introduce latency consisting of at least one of filtering, derivation, integration, statistics, FFT analysis, octave analysis, correlation, PID control on a plurality of received signal data samples.

9. The method of claim 7 wherein said executing is performed in real time.

10. The method of claim 7 wherein an output result of said executing includes latency information associated with both of a delay in retrieving missing signal data samples and also a delay arising due to said executing.

11. The method of claim 10 wherein the output result of said executing includes a first output delayed by said rearranging of the final remapping and a second output emitted prior to said rearranging and therefore not delayed.

12. The method of claim 7 further comprising:
   controlling, with the controller, the at least one output device in response to said executing.

13. The method of claim 1 wherein each signal data sample further comprises latency information due to said rearranging for final mapping of the series of signal data samples.

14. The method of claim 1 further comprising:
   transmitting, with the controller, contents of the buffer after said remapping to remote view clients.

15. The method of claim 1 further comprising:
   transmitting, with the controller, contents of the buffer to storage that is physically remote from or local to the controller.

16. The method of claim 1 further comprising:
   controlling, with the controller, the at least one output device in real time regardless of an outcome of said comparing.

17. The method of claim 16 wherein said controlling the at least one output device and said requesting the missing signal data sample are performed substantially concurrently.

18. The method of claim 16 wherein said controlling the at least one output device and said remapping are performed substantially concurrently.

19. The method of claim 1 wherein said transmitting the at least one output device is further defined as:

transmitting in real time, with the controller, to the at least one output device being an actuator applying a physical load on a test subject, the at least a portion of the present signal data sample prior to said receiving the missing signal data sample by the controller.

20. A system for configuring a transfer of signals associated with an iterative and synchronized, time-based data acquisition (DAQ) operation between at least one input device and at least one output device, the system comprising:

an input device configured to transmit signal data samples associated with a test subject;

a computing device in communication with said input device, said computing device having a controller with one or more processors and a non-transitory, computer readable medium storing instructions that, when executed by said one or more processors, cause said computing device to perform operations comprising:

requesting and receiving, in real time, said signal data samples from said at least one input device;

preliminarily mapping a series of said received signal data samples to a buffer as the requesting and receiving is repeated after a predetermined and equidistant time interval;

comparing with said controller a time indicator of each of said series of received signal data samples against a time indicator of a previously-received signal data sample to confirm that no signal data sample is lost;

requesting from said at least one input device with said controller a missing signal data sample in response to said comparing if one of said signal data samples is lost;

transmitting said missing signal data sample to said controller from said at least one input device in response to the requesting of said missing signal data sample;

receiving at said controller, from said at least one input device, said missing signal data sample in response to the transmitting;

rearranging said series of signal data samples for final mapping in said buffer with said controller to arrange said series in time sequence; and transmitting in real time, with said controller, to said at least one output device, at least a portion of a present signal data sample prior to the receiving of said missing signal data sample by said controller.

* * * * *